US011643210B2

(12) United States Patent
Davies et al.

(10) Patent No.: US 11,643,210 B2
(45) Date of Patent: May 9, 2023

(54) FLEXIBLE BAR AND SHOP SPACE FOR AIRCRAFT CABIN

(71) Applicant: B/E Aerospace, Inc., Winston-Salem, NC (US)

(72) Inventors: Jack D. Davies, Whitney (GB); Hsin-I Tsai, Newport Pagnell (GB)

(73) Assignee: B/E Aerospace, Inc., Winston-Salem, NC (US)

( * ) Notice: Subject to any disclaimer, the term of this patent is extended or adjusted under 35 U.S.C. 154(b) by 76 days.

(21) Appl. No.: 17/210,851

(22) Filed: Mar. 24, 2021

(65) Prior Publication Data

US 2021/0300562 A1   Sep. 30, 2021

Related U.S. Application Data

(60) Provisional application No. 63/001,137, filed on Mar. 27, 2020.

(51) Int. Cl.
*B64D 11/00* (2006.01)
*B64D 11/04* (2006.01)
*B64D 13/06* (2006.01)

(52) U.S. Cl.
CPC .......... *B64D 11/0007* (2013.01); *B64D 11/04* (2013.01); *B64D 2011/0046* (2013.01); *B64D 2013/0629* (2013.01)

(58) Field of Classification Search
CPC ................ B64D 11/0007; B64D 11/04; B64D 2011/0046; B64D 2013/0629
See application file for complete search history.

(56) References Cited

U.S. PATENT DOCUMENTS

| 2,137,717 | A | 11/1938 | Henry |
| 7,901,018 | B2 | 3/2011 | Baughman |
| 8,387,916 | B2 | 3/2013 | Baatz et al. |
| 11,130,575 | B2 * | 9/2021 | Vaninetti ................ A47B 31/06 |
| 2014/0125092 | A1 * | 5/2014 | Schreuder ............. B64D 11/00 29/401.1 |

(Continued)

FOREIGN PATENT DOCUMENTS

| CN | 207461766 U | 6/2018 |
| WO | 2019213123 A1 | 11/2019 |
| WO | WO-2019213132 A1 * | 11/2019 ............ B64D 11/00 |

OTHER PUBLICATIONS

Extended Search Report for European Application No. 21165707.7 dated Aug. 25, 2021, 8 pages.

*Primary Examiner* — Joshua J Michener
*Assistant Examiner* — Cindi M Curry
(74) *Attorney, Agent, or Firm* — Suiter Swantz pc llo

(57) ABSTRACT

A modular bar and shop space for an aircraft galley is disclosed. In embodiments, the bar and shop space includes an aircraft monument installable either adjacent to a galley complex or as a standalone. The monument has upper and lower portions disposed behind upper and lower panels; the upper portion includes chiller and warmer compartments. The lower portion includes storage shelving and is deployable into the space in front of the monument. When the lower portion deploys, the vertical upper panel tracks downward into a horizontal workdeck above the storage shelving. The deployed workdeck may be used as a counterspace for a snack bar or social area for passengers, or as additional temporary workspace for cabin crew.

12 Claims, 8 Drawing Sheets

(56) References Cited

U.S. PATENT DOCUMENTS

| | | | | |
|---|---|---|---|---|
| 2015/0069891 A1* | 3/2015 | Schimanowski | ...... | B64D 11/04 |
| | | | | 312/242 |
| 2015/0360782 A1* | 12/2015 | Jin | ...... | B64D 11/06 |
| | | | | 244/118.5 |
| 2017/0320580 A1* | 11/2017 | Roth | ...... | B64D 11/0627 |
| 2018/0086467 A1 | 3/2018 | Truemper | | |
| 2019/0308728 A1* | 10/2019 | McKee | ...... | B64D 11/0007 |
| 2019/0337623 A1* | 11/2019 | Vaninetti | ...... | B64D 11/0691 |
| 2020/0354060 A1* | 11/2020 | Vaninetti | ...... | A47B 31/06 |

* cited by examiner

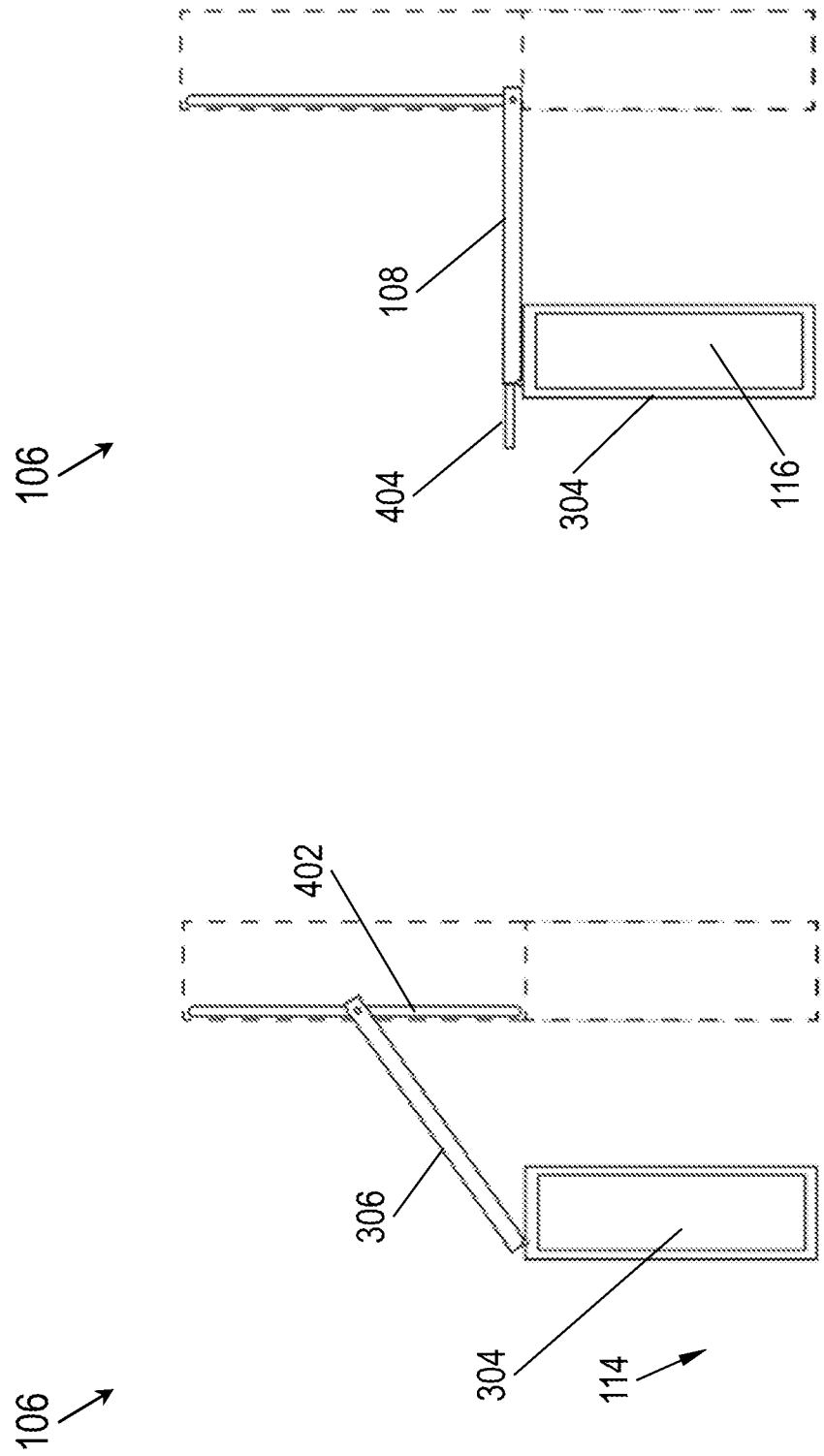

FLEXIBLE BAR AND SHOP SPACE FOR AIRCRAFT CABIN

CROSS-REFERENCE TO RELATED APPLICATIONS

The present application is related to and claims the benefit of the earliest available effective filing dates from the following listed applications (the "Related Applications") (e.g., claims earliest available priority dates for other than provisional patent applications (e.g., under 35 USC § 120 as a continuation in part) or claims benefits under 35 USC § 119(e) for provisional patent applications, for any and all parent, grandparent, great-grandparent, etc. applications of the Related Applications).

RELATED APPLICATIONS

U.S. Provisional Patent Application Ser. No. 63/001,137 entitled FLEXIBLE BAR AND SHOP SPACE FOR AIRCRAFT CABIN, filed Mar. 27, 2020;

Said U.S. Provisional Patent Application 63/001,137 is herein incorporated by reference in its entirety.

TECHNICAL FIELD

The subject matter disclosed by the instant application is directed generally to aircraft interiors and more particularly to flexible work and storage spaces for passenger cabins.

BACKGROUND

Widebody aircraft may incorporate aft galley complexes to supplement the galley facilities generally found at the front of the cabin. If, for example, these aft galley facilities are disposed just aft of the rear exit doors, the additional space provided by said exit doors may provide inflight opportunities for self-service and/or social interaction spaces for passengers (and consequent opportunities for revenue generation by airlines), where these spaces may go otherwise unused or undeveloped during cruising segments.

SUMMARY

A modular bar and shop space for an aircraft galley complex is disclosed. In embodiments, the bar and shop space includes a monument installable in an aircraft cabin (e.g., attached to an aft galley complex). The monument includes an upper portion and a lower portion; the upper portion is disposed behind a central panel and includes one or more temperature-controlled compartments (e.g., warmers, chillers, bottle chillers). The lower portion sits under the upper portion (e.g., between the upper portion and the cabin floor) and includes storage shelves or receptacles. In an undeployed state, the temperature-controlled compartments are concealed behind the central panel, which remains in a vertical orientation. The bar and shop space is deployed by pulling the lower portion forward into a galley space (e.g., a passageway between galley monuments). The upper panel transitions along with the deploying lower portion, pivoting into a horizontal orientation and serving as a workdeck above the lower portion shelves.

An aircraft galley complex is also disclosed. In embodiments, the galley complex includes one or more monuments installable in an aircraft cabin. A modular bar and shop space is installable adjacent to one of the monuments, the bar and shop space having an undeployed and a deployed configuration. The bar and shop space includes an upper portion atop a lower portion, the upper portion including one or more temperature-controlled compartments concealed behind a vertical central panel when the bar and shop space is undeployed. The lower portion includes storage shelves and receptacles also concealed behind a central panel. The bar and shop space is deployed by pulling the lower portion (e.g., central panel and shelves directly behind) forward into a galley space, e.g., a passageway or other space between monuments of the complex. When the lower portion deploys forward, the upper central panel pivots downward into a horizontal workdeck above the lower portion shelves, providing access to the temperature-controlled compartments within the upper portion.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

FIGS. 4A through 4D are diagrammatic illustrations of deployment operations of the modular bar and shop space of FIG. 1;

DETAILED DESCRIPTION

Figure 1:
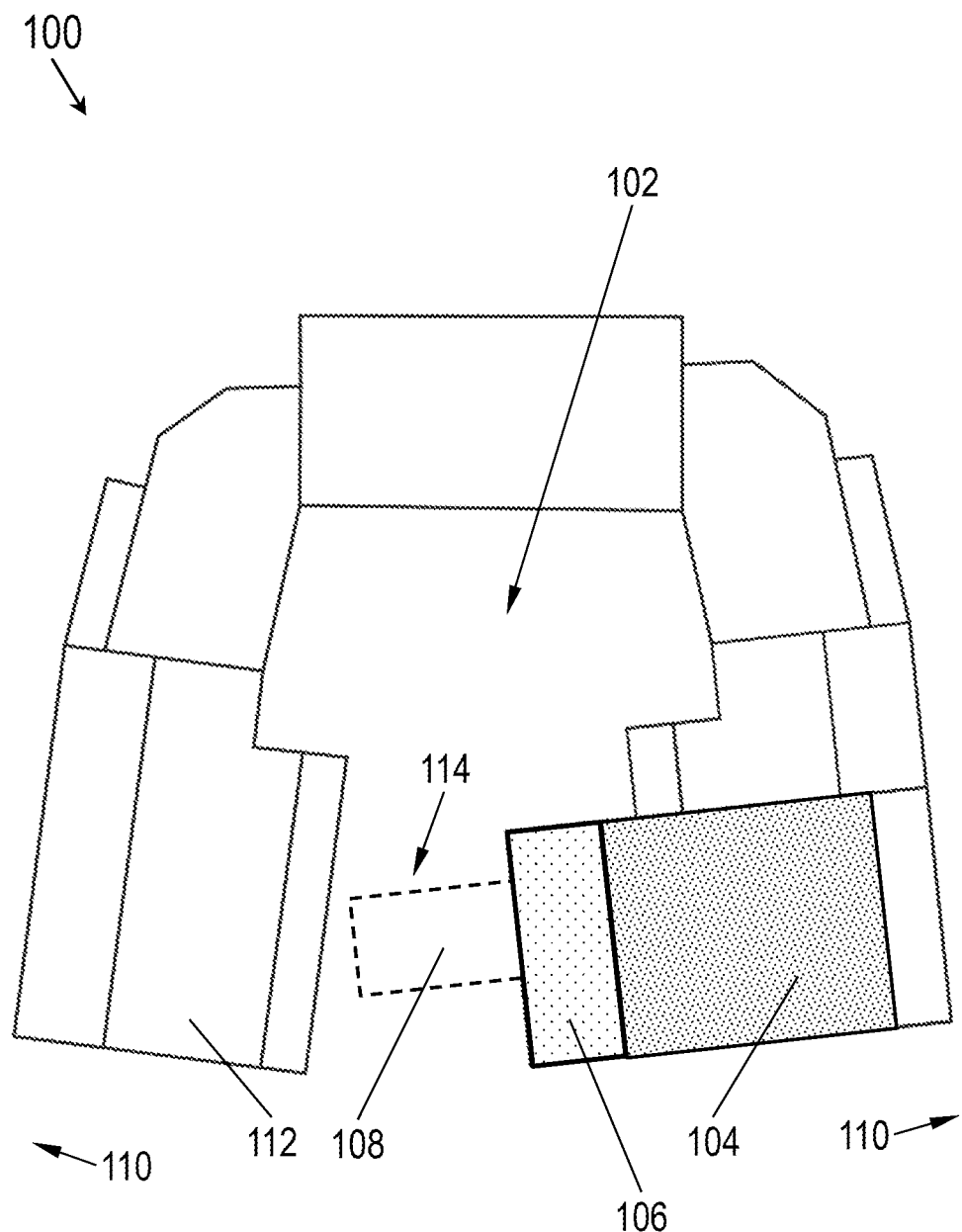
FIG. 1 is an overhead view.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Figure 2:
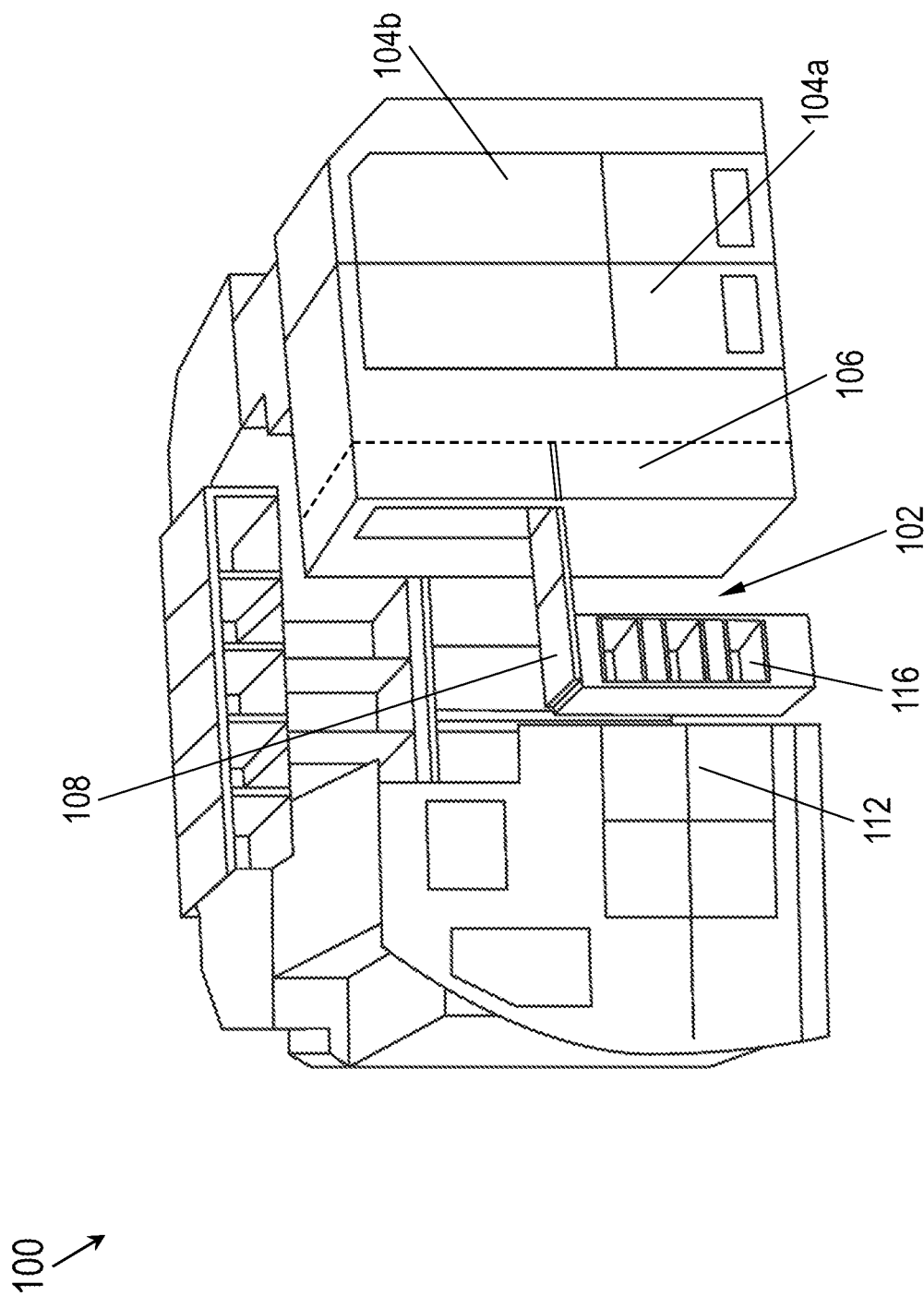
FIG. 2 is a forward isometric view, of a modular bar and shop space for an aft galley complex according to example embodiments of this disclosure.

Referring generally to FIGS. 1 and 2, a galley complex 100 is disclosed. The galley complex 100 may include an interior galley space 102 and may incorporate lavatory modules 104 and a modular bar and shop space 106 with deployable workdeck 108.

In embodiments, the galley complex 100 may be deployed or installed within a passenger cabin of a widebody commercial aircraft. For example, the galley complex 100 may be disposed at the aft end of the passenger cabin, e.g., directly aft of the aft emergency exits 110. Within the interior galley space 102, cabin crew may have access to storage facilities and food preparation equipment, e.g., chiller compartments, chilled galley carts; ovens and warmers; beverage makers (e.g., coffee/tea brewers, hot water dispensers); and work surfaces.

In embodiments, the galley complex 100 may incorporate lavatory modules 104 accessible to passengers and opening into the common area between the emergency exits 110 and directly forward of the galley complex. Between the lavatory modules 104 (e.g., lavatory units 104a-b installed on the port side of the aircraft) and a starboard portion 112 of the galley complex 100, a passageway 114 may provide access to the interior galley space 102 to cabin crew. In some embodiments, the galley complex 100 may be modular in nature such that the lavatory modules 104 may be incorporated on the starboard side of the passageway 114 and the bar and shop space 106 incorporated on the port side. In some embodiments, the bar and shop space 106 may be incorporated as a standalone monument, e.g., against a bulkhead or class divider, proximate to an exit space. In some embodiments, the bar and shop space 106 may be implemented elsewhere within the passenger cabin as a temporary workspace for crewmembers, or as a congregational/gathering space for passengers once the aircraft has reached safe cruising altitude.

In embodiments, the galley complex 100 may incorporate the bar and shop space 106 directly adjacent to the lavatory modules 104 and passageway 114. For example, the bar and shop space 106 may, in its undeployed state, provide additional storage space, including temperature-controlled storage space for perishable items. In its deployed state, the deployable workdeck 108 of the bar and shop space 106 may provide a congregational space for passengers (e.g., while the aircraft is at a safe cruising altitude) while restricting passenger access to the interior galley space 102 via the passageway 114. For example, in its deployed state the bar and shop space 106 may include a workdeck 108 extending across the passageway 114 as well as additional shelving 116 under the workdeck. Cabin crew may provide refreshments for purchase by passengers at the workdeck 108, which may serve as a temporary table or bar surface. Alternatively, the workdeck 108 may provide additional workspace (e.g., food preparation space) for cabin crew.

Figure 3B:
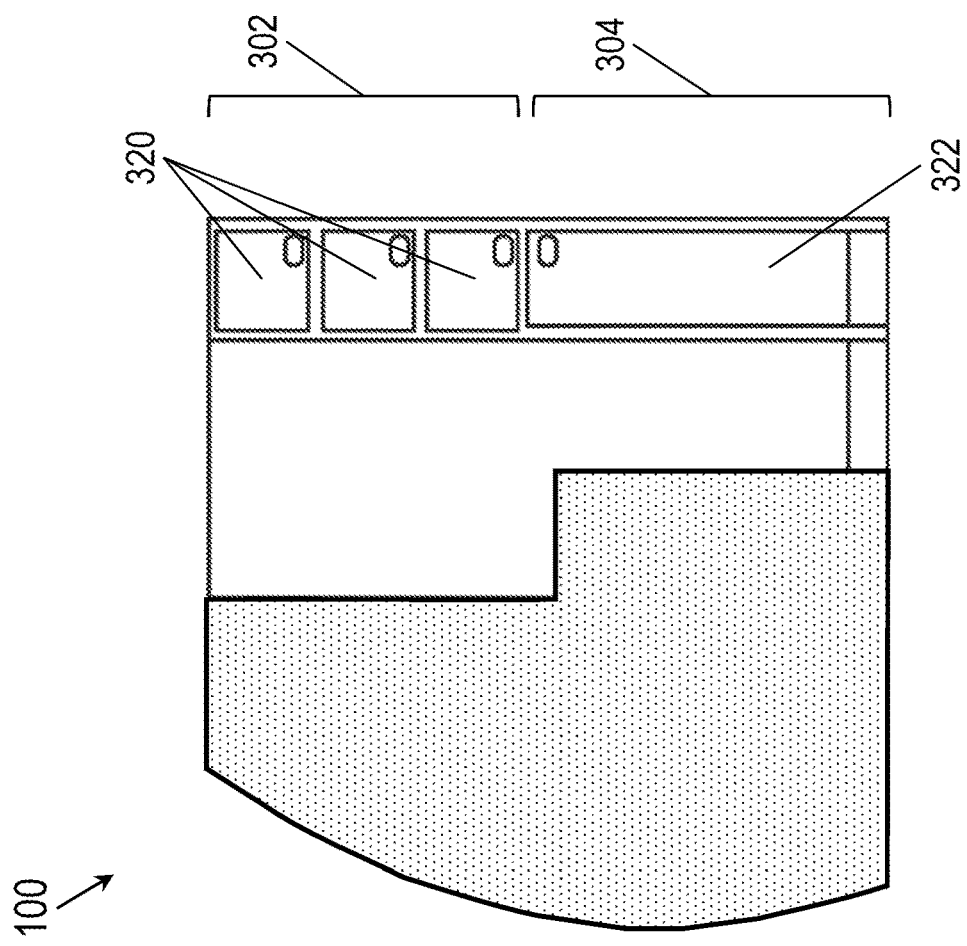
FIG. 3B is a forward view of the modular bar and shop space of FIG. 1 in an undeployed state.
Figure 3A:
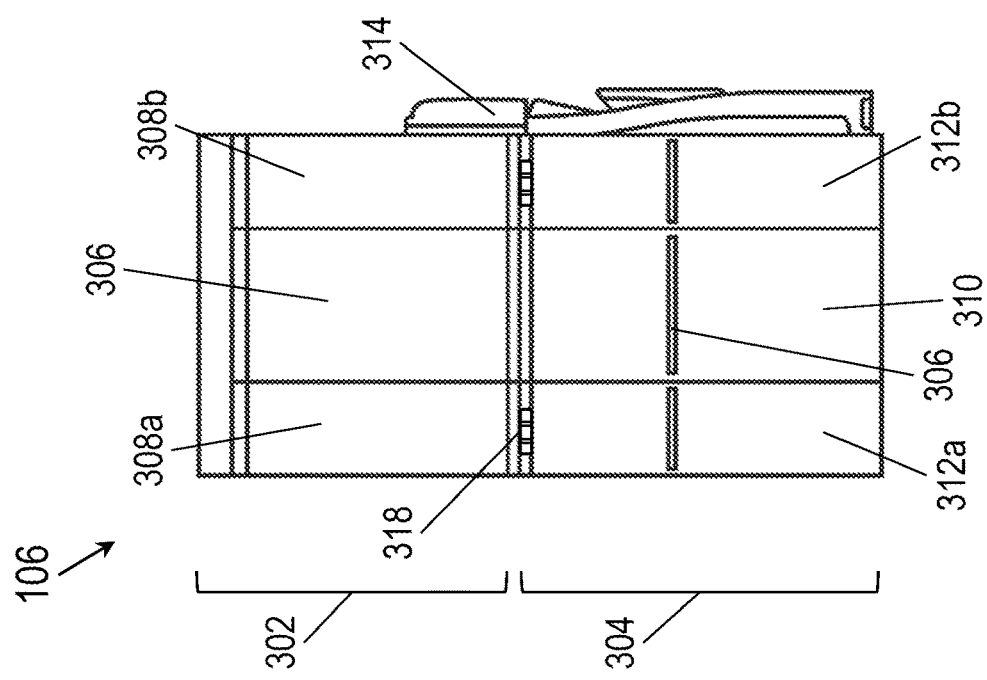
FIG. 3A is a rear partial cutaway view of the modular bar and shop space and aft galley complex of FIG. 1.

Referring to FIGS. 3A and 3B, the bar and shop space 106 and galley complex 100 are shown.

In embodiments, referring in particular to FIG. 3A, the bar and shop space 106 (e.g., as seen from the passageway 114, FIG. 1) may include an upper portion 302 and a lower portion 304 directly beneath the upper portion. For example, the upper portion 302 may include a central upper panel 306 and side upper panels 308a-b, while the lower portion 304 may include a central lower panel 310 and side lower panels 312a-b. In some embodiments, a cabin attendant seat 314 may be attached to the forward end of the bar and shop space 106 and/or the galley complex 100. The upper and lower portions 302, 304 may further include bumpers 316 (e.g., to protect the lower portion 304 from impact damage from galley carts) and latched handles 318 for deploying the lower portion.

In embodiments, referring also to FIG. 3B, the bar and shop space 106 (as seen from the interior galley space (102, FIG. 1) may include additional storage accessible from the interior galley space. For example, the upper portion 302 may include (e.g., behind the rear side upper panel 308a) storage compartments 320 accessible from the interior galley space 102 (e.g., Standard Unit (SU) storage compartments). Similarly, the lower portion 304 may include (e.g., behind the rear side lower panel 312a) a cart bay 322 (e.g., or a storage compartment of comparable size to a cart bay) capable of stowing a standard-size galley cart therewithin. In some embodiments, if the galley complex 100 includes an air chiller system, power supply, or control system for galley insert (GAIN) devices, the cart bay 322 may be connected to an air supply recirculating within the galley complex and capable of chilling the galley cart (and its contents) via contact with the chilled recirculating air supply.

Figure 4B:
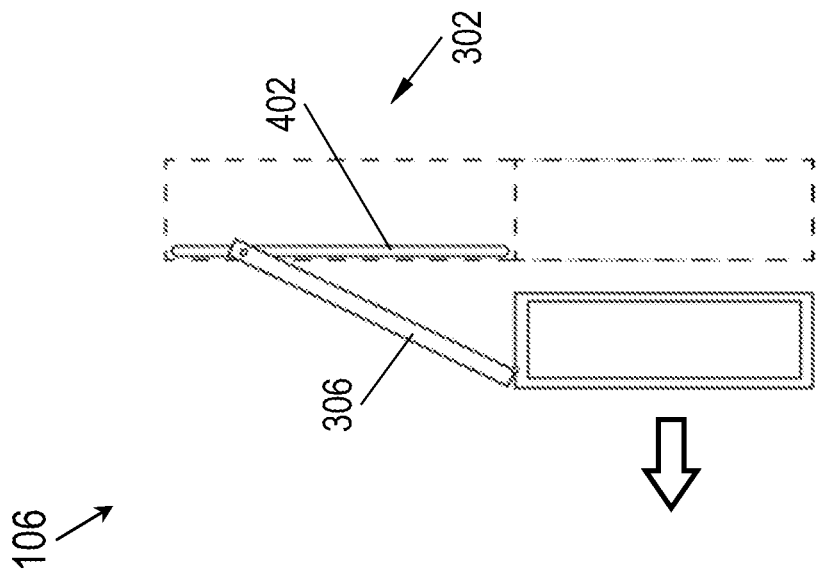
Figure 4A:
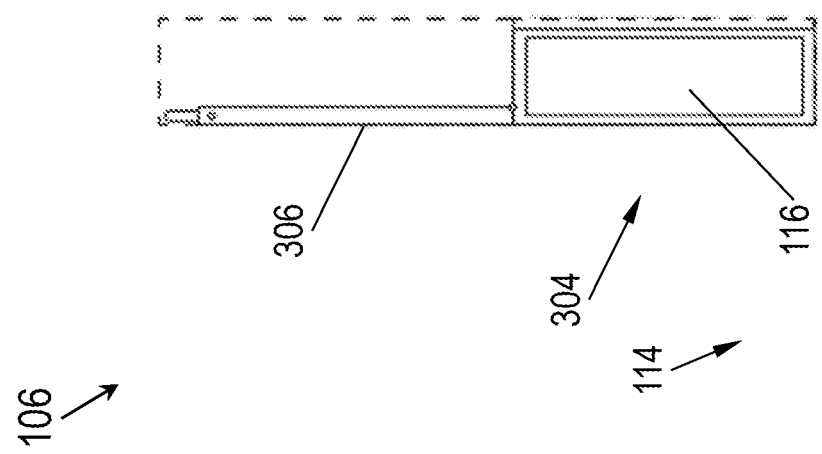

Referring to FIGS. 4A through 4B, the bar and shop space 106 is shown.

In embodiments, the bar and shop space 106 may be deployed by converting the central upper panel 306, which in its undeployed state (as shown by FIG. 4A) has a substantially vertical orientation, to the substantially horizontal workdeck 108 shown by FIG. 4D. For example, the bar and shop space 106 may be deployed by pulling the lower portion 304 and shelving 116 into the passageway 114 (e.g., via the latched handle 318).

In embodiments, referring in particular to FIG. 4B, as the lower portion 304 is pulled into the passageway 114, the central upper panel 306 may track downward along rails 402 set into the upper portion 302. Referring in particular to FIGS. 4C and 4D, the central upper panel 306 may track downward into a horizontal orientation corresponding to the workdeck 108, supported by the shelving 116 of the lower portion 304.

It should be noted that the deployed workdeck 108 may not extend fully across the passageway 114 (due, for example, to the diagonal orientation of the opposing end of the starboard portion (112, FIG. 1) of the galley complex (100, FIG. 1)). Accordingly, in embodiments, the workdeck 108 may incorporate an auxiliary table 404 extendable from the workdeck and capable of partially or fully bridging any remaining space between the workdeck 108 and the opposing end of the starboard portion 112.

Figure 5:
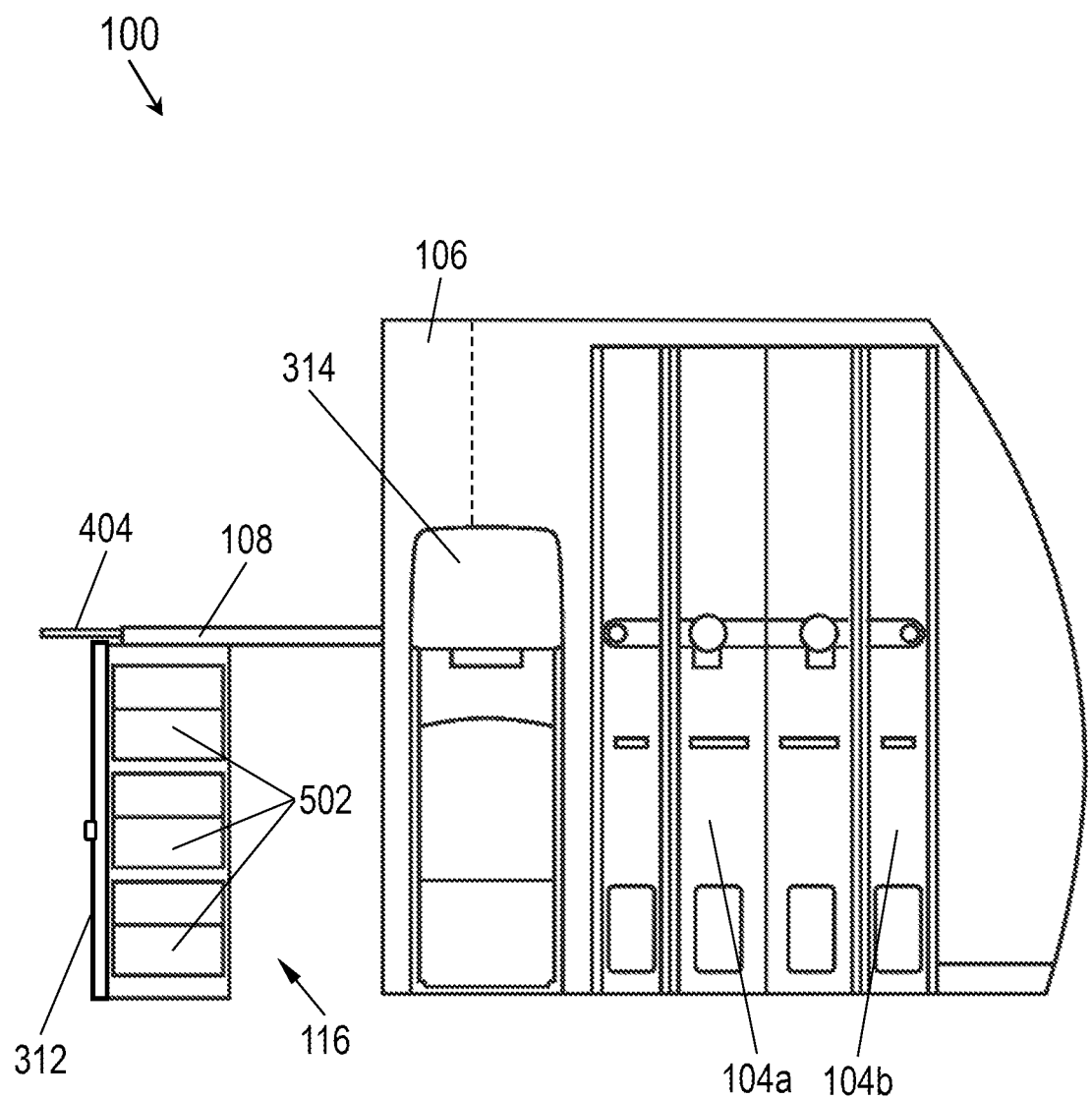
FIG. 5 is a forward view of the aft galley complex and modular bar and shop space of FIG. 1, showing a left-side end view of the modular bar and shop space in a deployed state.

Referring to FIG. 5, the galley complex 100 is shown with the bar and shop space 106 in a deployed state.

In embodiments, the auxiliary table 404 may be extended from the workdeck 108 in its fully deployed state. For example, the bottom end of the central upper panel (306, FIG. 4A) may correspond to the left side end of the workdeck 108, which may terminate just short of the central lower panel 312 and shelving 116. In some embodiments, the mounting for the cabin attendant seat 314 may be shared by the forward wall of the galley complex 100 and the bar and shop space 106 to allow adequate space for the lavatory modules 104a-b. In embodiments, the shelving 116 may be capable of temporary stowing container boxes 502, e.g., of Standard Unit (SU) size.

Figure 6B:
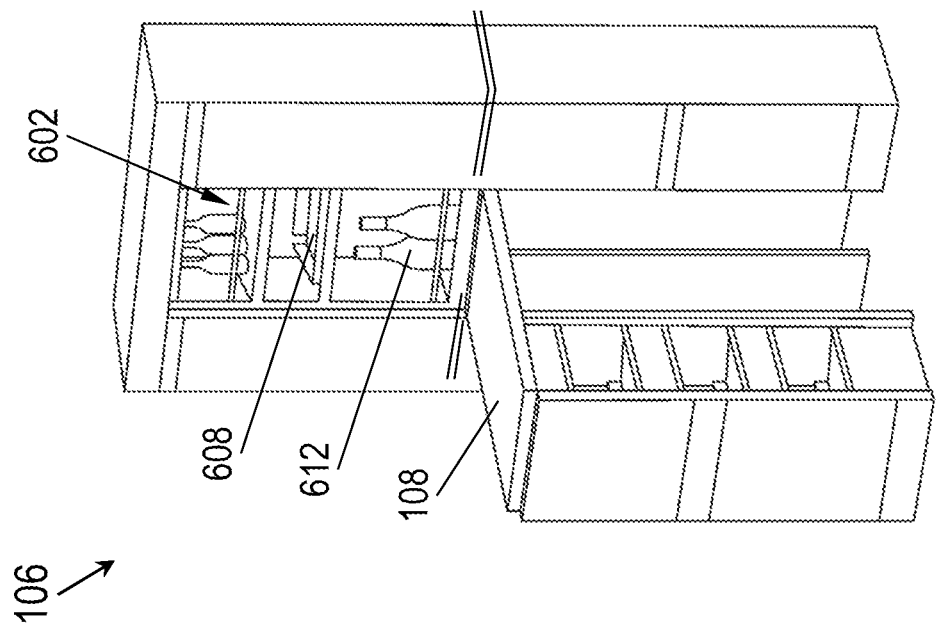
FIGS. 6A and 6B are respectively left-side isometric and right-side isometric views of the modular bar and shop space of FIG. 1 in a deployed state.
Figure 6A:
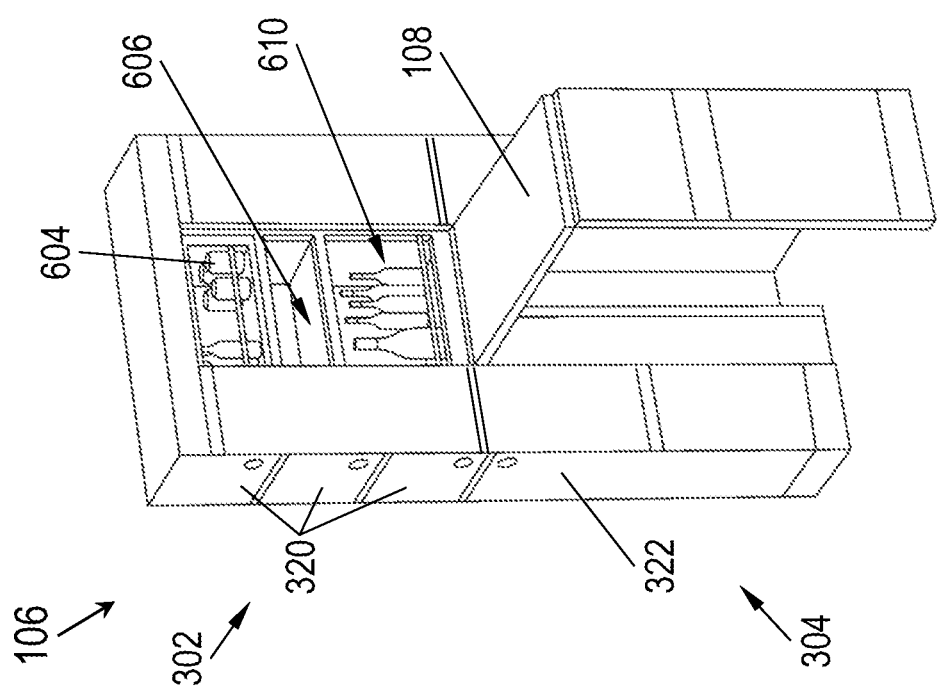

Referring to FIGS. 6A and 6B, the bar and shop space 106 is shown.

In embodiments, the deployment of the central upper panel 306 (FIG. 3A) into the workdeck 108 may provide access to the inner central components of the upper portion 302 of the bar and shop space 106. For example, the upper portion 302 may include behind the central upper panel 306 several temperature-controlled storage compartments. For example, a chiller container 602 may provide cold storage of chillable or perishable food products or beverages (e.g., canned beverages 604). In some embodiments, the upper portion 302 may include bakery storage compartments 606 for heating or warming baked goods on trays 608. Refreshments and beverages stored within the upper portion 302 may be provided to passengers by a cabin crewmember stationed within the interior galley space (102, FIG. 1). Similarly, the storage compartments 320 and cart bay 322 may be accessible to cabin crew from the interior galley space 102. In some embodiments, the upper portion 302 may include one or more non-temperature-controlled compartments for storage of utensils or nonperishable food products. For example, the lower storage compartment 610 may provide room-temperature storage of wine bottles (612) or other canned or bottled beverages that require neither chilling nor warming. In some embodiments, the lower storage compartment 610 may be a bottle chiller providing for chilled storage of the wine bottles 612 (e.g., for Champagne or other beverages preferably stored or served chilled).

Alternatively, passengers may help themselves to refreshments from the other side of the workdeck 108. Similarly, the chiller container, lower storage compartment 610, and bakery storage compartments 606 may be combined in other configurations or arrangements as space allows.

Figure 7:
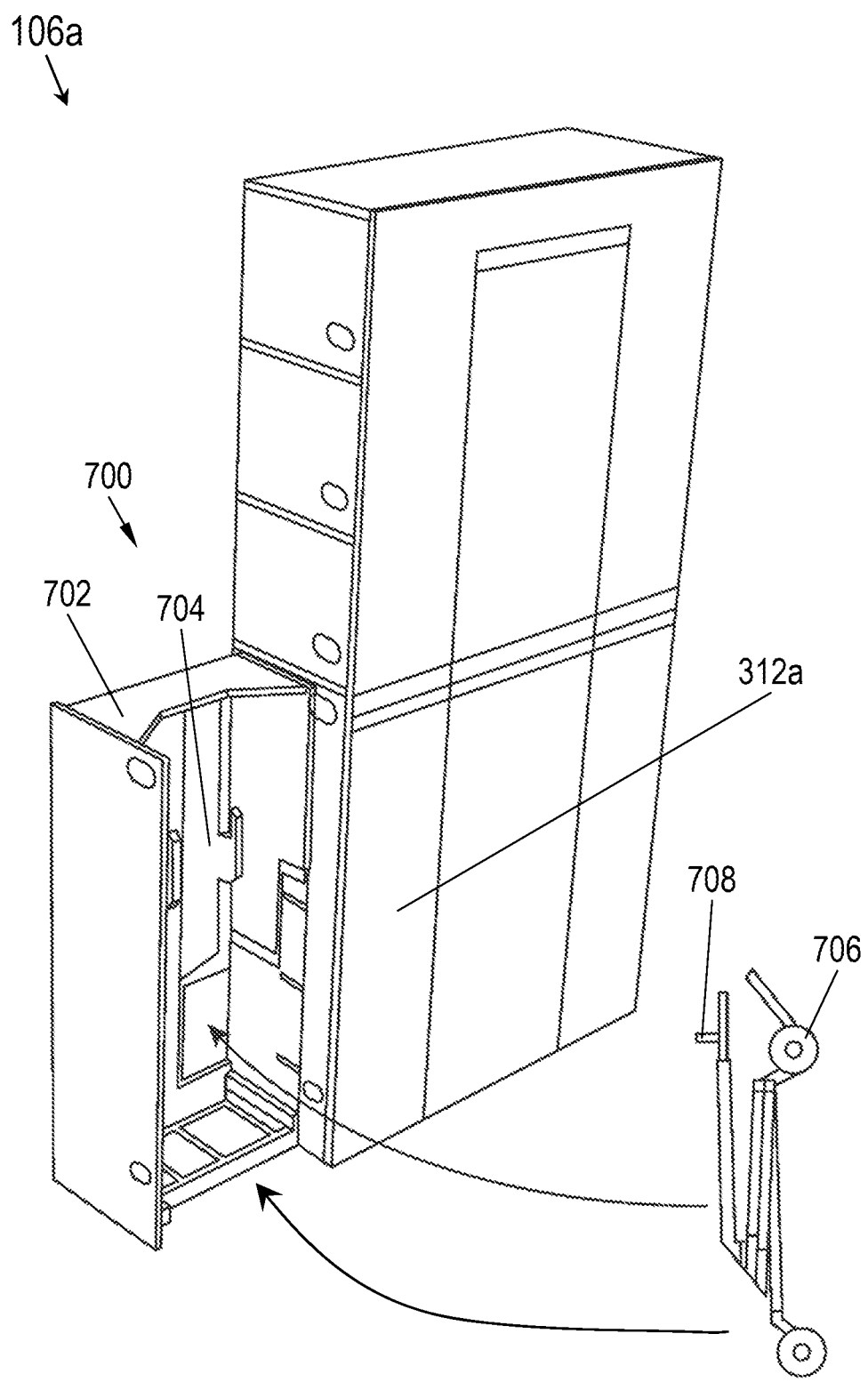
FIG. 7 is a left-side end view of the modular bar and shop space of FIG. 6A.

Referring to FIG. 7, the bar and shop space 106a may be implemented and may function similarly to the bar and shop space 106 of FIG. 6A, except that the bar and shop space 106a may replace the cart bay (322, FIG. 6A) in the lower portion (304, FIG. 6A) with a lower storage compartment 700 configured for wheelchair storage.

In embodiments, the lower storage compartment 700 disposed behind the rear side lower panel 312a may be configured with a frame 702 and/or holder 704 capable of accommodating a wheelchair 706, e.g., folded to minimize its size. For example, the wheelchair 706 may be secured on the holder 704, e.g., by its handle 708, and the storage compartment 700 retracted into the bar and shop space 106a.

In some embodiments, the bar and shop space 106, 106a may be deployed in other configurations throughout the aircraft cabin. For example, the workdeck (108, FIGS. 6A-B) and storage compartments within the upper portion (302, FIG. 6A) and lower portion 304 may be deployed independently of the aft galley complex (100, FIG. 1). For example, the workdeck 108 and storage compartments of the upper and lower portions 302, 304 may be incorporated adjacent to a bulkhead, monument, or class divider elsewhere within the aircraft cabin, the workdeck 108 deployable into any otherwise temporarily unused space.

CONCLUSION

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

We claim:

1. A modular snack bar for an aircraft galley complex, comprising:
   a monument installable in a passenger cabin of an aircraft, the monument comprising:
   a central upper panel and at least one side upper panel adjacent to the central upper panel;
   an upper portion disposed behind the central upper panel, the upper portion including at least one temperature-controlled compartment;
   a central lower panel and at least one side lower panel adjacent to the central lower panel; and
   a lower portion beneath the upper portion, the lower portion disposed behind the central lower panel, the lower portion including one or more of a storage shelf and a storage receptacle;

the monument having an undeployed state corresponding to a vertical orientation of the central upper panel, and capable of being transitioned from the undeployed state to a deployed state by deploying the lower portion forward into a galley space, and the central upper panel configured to transition with the deploying lower portion into a horizontal orientation atop the lower portion, the horizontal orientation corresponding to the deployed state of the monument.

2. The modular snack bar of claim 1, wherein the at least one galley complex is a first galley complex and:

the first galley complex is separated by at least one second galley complex by the galley space;

the deployed central upper panel and lower portion are configured to extend partially across the galley space toward the second galley complex;

and the deployed central upper panel includes at least one auxiliary table configured to extend from the deployed central upper panel toward the second galley complex.

3. The modular snack bar of claim 1, wherein:

the at least one temperature-controlled compartment includes at least one of:

a chiller compartment configured to maintain its contents at a temperature below the ambient temperature;

and a warmer compartment configured to maintain its contents at a temperature above the ambient temperature.

4. The modular snack bar of claim 3, wherein the chiller compartment includes a bottle chiller configured to accommodate at least one bottled beverage.

5. The modular snack bar of claim 1, wherein the upper portion further comprises:

at least one upper storage compartment disposed behind the at least one side upper panel, the upper storage compartment accessible from the galley space.

6. The modular snack bar of claim 1, wherein the lower portion further comprises:

at least one lower storage compartment disposed behind the at least one side lower panel, the lower storage compartment accessible from the galley space.

7. The modular snack bar of claim 6, wherein the lower storage compartment includes a cart bay configured for stowing at least one galley cart therewithin.

8. The modular snack bar of claim 1, wherein the upper portion includes at least one room-temperature storage compartment.

9. An aircraft galley complex, comprising:

one or more galley monuments collectively installable in a passenger cabin of an aircraft, the one or more galley monuments including at least one first galley monument;

at least one modular snack bar installable adjacent to the first galley monument, the modular snack bar having a deployed configuration and an undeployed configuration and comprising:

a central upper panel and at least one side upper panel adjacent to the central upper panel;

an upper portion disposed behind the central upper panel, the upper portion including at least one temperature-controlled compartment, the central upper panel having a vertical orientation corresponding to the undeployed configuration;

a central lower panel and at least one side lower panel adjacent to the central lower panel;

and a lower portion beneath the upper portion, the lower portion disposed behind the central lower panel, the lower portion including one or more of a storage shelf and a storage receptacle;

the modular snack bar capable of being transitioned from the undeployed configuration to the deployed configuration by deploying the lower portion forward into a galley space, and the central upper panel configured to transition with the deploying lower portion into a horizontal orientation atop the lower portion, the horizontal orientation corresponding to the deployed configuration.

10. The aircraft galley complex of claim 9, wherein:

the one or more galley monuments include at least one galley insert (GAIN) device operatively connected to one or more of a galley power supply and a galley network;

and the at least one temperature-controlled compartment is operatively connected to one or more of the galley power supply and a galley network.

11. The aircraft galley complex of claim 9, wherein:

the one or more galley monuments at least partially enclose an interior galley space accessible from the passenger cabin by a passageway;

the deployed lower portion and the central upper panel in the horizontal orientation partially extend across the passageway;

and the central upper panel includes at least one auxiliary table configured to extend across the passageway beyond the deployed central upper panel.

12. The aircraft galley complex of claim 9, wherein:

the upper portion includes at least one room-temperature storage compartment.

* * * * *